Jan. 12, 1937.   B. LOEFFLER   2,067,611
CONTROL MECHANISM FOR DIESEL ENGINES
Filed June 4, 1935    3 Sheets-Sheet 1
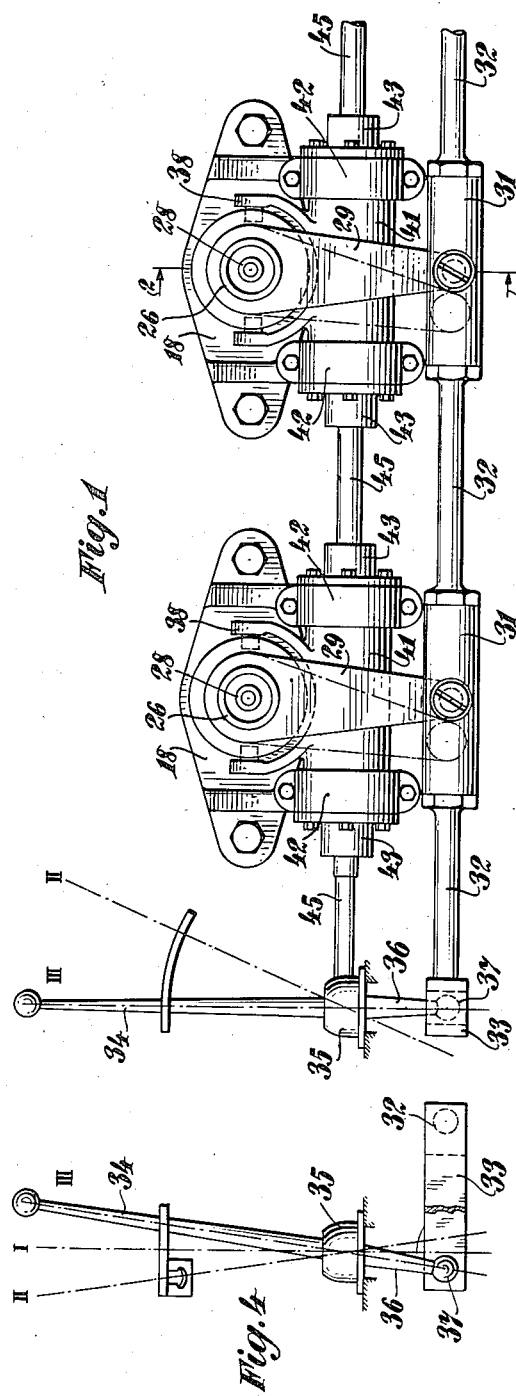
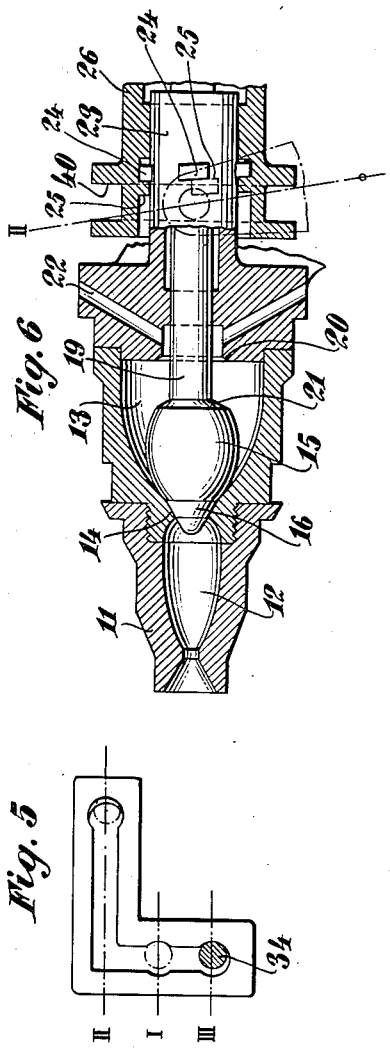
INVENTOR.
Bruno Loeffler,
BY
HIS ATTORNEYS Jan. 12, 1937.  B. LOEFFLER  2,067,611
CONTROL MECHANISM FOR DIESEL ENGINES
Filed June 4, 1935  3 Sheets-Sheet 2
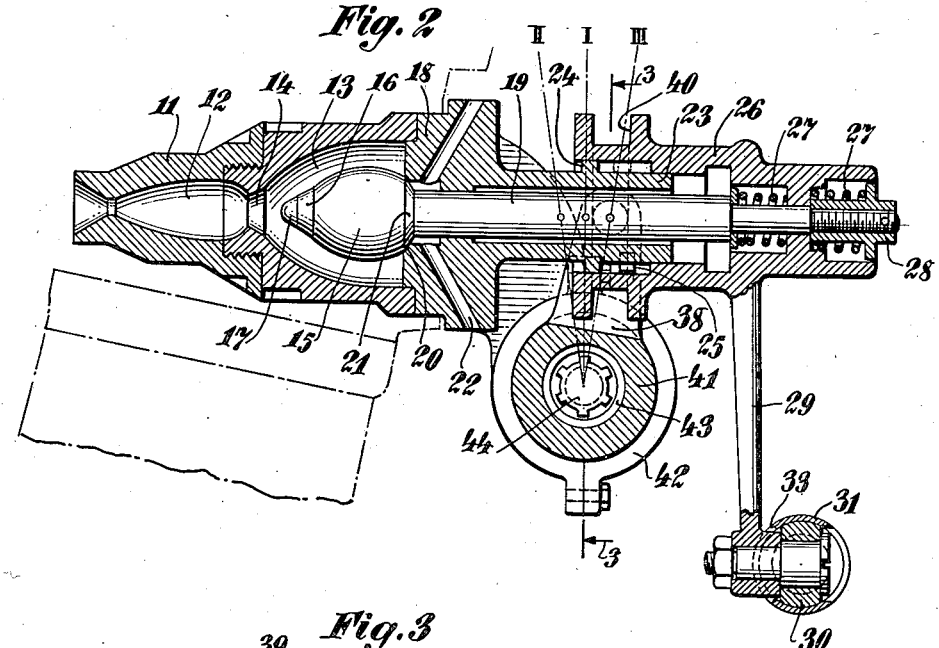
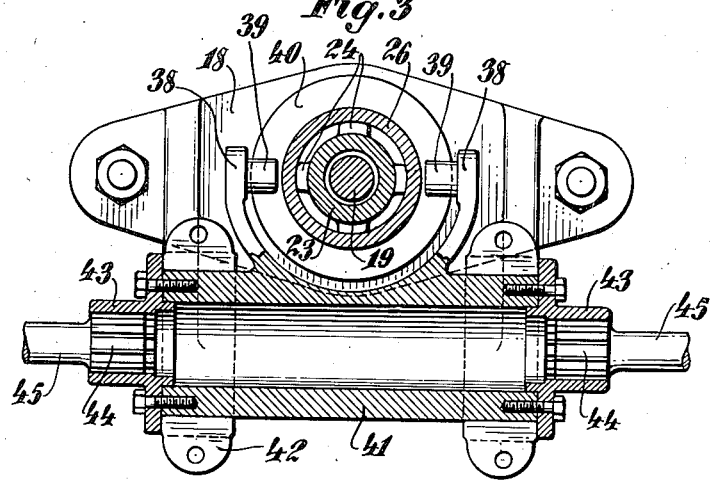
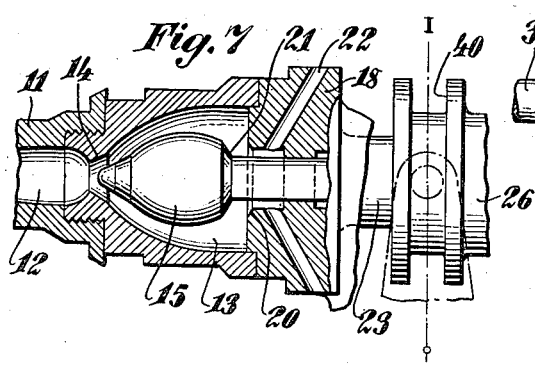
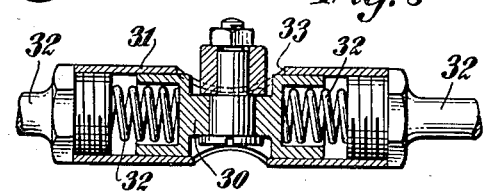
INVENTOR.
Bruno Loeffler,
BY Hoguet, Neave & Campbell
HIS ATTORNEYS

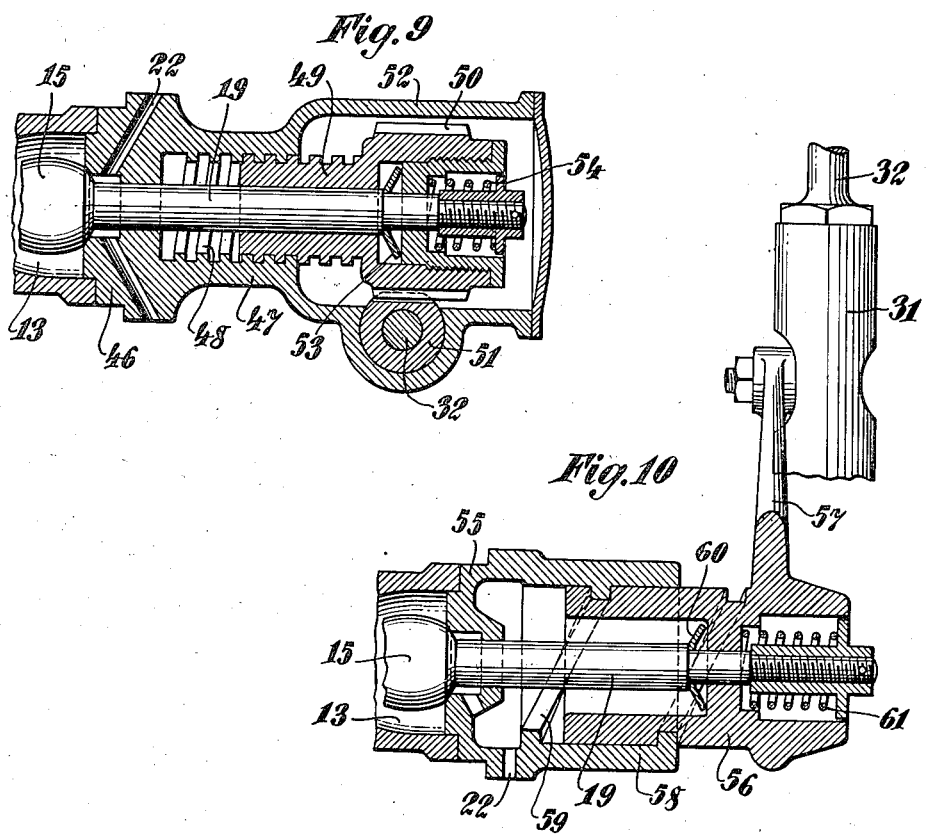

Patented Jan. 12, 1937

2,067,611

UNITED STATES PATENT OFFICE 2,067,611

CONTROL MECHANISM FOR DIESEL ENGINES

Bruno Loeffler, Plainfield, N. J., assignor to International Motor Company, New York, N. Y., a corporation of Delaware Application June 4, 1935, Serial No. 24,825

10 Claims. (Cl. 123—48)

The present invention relates to control mechanisms for internal combustion engines and embodies, more specifically, an improved control mechanism by means of which the operation of Diesel engines may be effectively controlled.

Certain types of Diesel engines are provided with combustion chambers which communicate with the cylinders and within which combustion initially takes place. In addition to these combustion chambers air chambers are provided in communication with the combustion chambers in order that during normal operation of the engine a sufficient volume of air and fuel may be received within these chambers to produce a desired combustion which improves the operation of the engine. In engines of the above character, it is desirable in the starting thereof to shut off the air chamber from the combustion chamber in order that the effective space within which the gases are compressed may be decreased, thus increasing the compression during the starting operation. Moreover, in cranking the engine it is desirable to prevent the building up of substantial compression until the inertia elements have attained a suitable speed and to this end valves have been provided for opening the combustion and air chambers to the atmosphere during the cranking operation.

To accomplish the foregoing steps in the operation of such Diesel engines, valves have heretofore been provided which have three positions, viz; an open position during which the gases within the combustion and air chambers may pass into the atmosphere, a position in which the valve is closed against one seat to subject only the compression chamber to the compression in the cylinder, and a third position in which the valve is closed against a second seat to subject the combustion and air chambers to the compression within the cylinder. These valves have been manually operated, each valve being separately operated and adjusted from the others of the engine.

It is an object of the present invention to provide a control mechanism by means of which the foregoing valves may be effectively operated from a relatively remote position.

A further object of the invention is to provide a control mechanism of the above character wherein all of the valves of an engine may be simultaneously and effectively operated to maintain them in desired positions.

A further object of the invention is to provide a convenient and effective mechanism by means of which the above valves may be operated to actuate the same properly without requiring the exercise of skill in causing the valves to be properly positioned in their various positions.

Further objects, not specifically enumerated above, will be apparent as the invention is described in greater detail in connection with the accompanying drawings, wherein:

Figure 1 is a view in front elevation, showing a control mechanism constructed in accordance with the present invention.

Figure 2 is a view in transverse section, taken on line 2—2 of Figure 1, and looking in the direction of the arrows.

Figure 3 is a view in longitudinal section, taken on the line 3—3 of Figure 2, and looking in the direction of the arrows.

Figure 4 is a view in end elevation, showing the manually operated portion of the mechanism of Figure 1.

Figure 5 is a plan view showing the guide plate of the manually operated member.

Figure 6 is a segmental view, similar to Figure 2, showing the valve seated in its second position.

Figure 7 is a view similar to Figure 6, showing the valve in its intermediate or open position.

Figure 8 is a detail view in section showing a portion of the valve actuating mechanism.

Figure 9 is a view similar to Figure 2 showing a modified form of the invention.

Figure 10 is a view similar to Figure 9 showing a further modification of the invention.

With reference to the construction shown in Figures 1 through 8, the engine structure which forms the combustion and air chambers is shown at 11, the combustion chamber being indicated at 12 and the air chamber at 13. Between these chambers a valve seat 14 is formed against which a valve 15 is adapted to be seated. The valve 15 is formed with a seat 16 which is adapted to engage the seat 14, a stream lined nose 17 being formed on the valve to facilitate fluid flow under certain conditions.

A plate 18 is secured to the engine structure and serves as a closure for the air chamber 13, as well as a support for the valve 15, a spindle 19 being rotatably and slidably mounted within the plate. The plate is formed with a valve seat 20 against which a second seat 21 on the valve 15 is adapted to engage when the valve is in its second closed position as indicated in Figure 2. The seat 20 thus affords a means by which communication is established between the air chamber 13 and passages 22 which communicate with the atmosphere.

Upon the plate 18, a sleeve 23 is formed, the sleeve being provided with diagonally disposed lugs 24 which are adapted to be engaged by cooperating cams 25 which are formed upon a bonnet 26, received over the sleeve 23. Upon rotation of the bonnet 26 with respect to the sleeve 23 the surfaces of the cams 25 engage the lugs 24 and cause the valve to be moved into the position shown in Figure 6. Motion of the bonnet is transmitted to the valve stem 19 through opposed springs 27 and nut 28 which is threaded to the end of stem 19. By means of the springs 27, the valve is held yieldingly in its positions.

The bonnet 26 is formed with an arm 29 by means of which it may be turned with respect to the valve stem 19. The end of this arm is connected to a plug 30 which is slidably received in a housing 31 and centered therein by means of opposed springs 32. The aperture 33 in the housing 31 permits relative motion to take place between the end of the arm 29 and the housing 31. In this fashion, the springs 32 permit relative motion between the arm 29 and housing 31 yieldingly and the valve may thus be firmly seated without requiring an exact motion of the housing 31.

As seen in Figure 1, the housing 31 forms part of a connecting rod 32 which is provided at one end with a transverse track or box 33. An actuating lever 34 is mounted for universal motion at 35 upon a relatively stationary element and is provided with a lower extremity 36, upon which a ball 37 is formed. The ball 37 is adapted to move within the box or track 33 and thus transmit longitudinal motion of the lever 34 to the connecting rod 32. Such longitudinal motion takes place when the lever 34 moves from its position as shown in Figure 1 to the dot and dash positions indicated by II and causes the arms 29 to be moved into the dot and dash positions shown. This relative rotation causes the bonnet 26 to advance the valve 15 into the closed position shown in Figure 6, at which time the air chamber 13 is out of communication with the combustion chamber 12 and the starting operation takes place.

Motion of the valve into its third or running position is effected by means of yoke 38 which is provided with fingers 39 adapted to engage a groove 40, formed upon the bonnet 26. The yoke 38 is formed upon a sleeve 41 which is journaled upon the engine by means of brackets 42. Each end of the sleeve is formed with cylindrical bushings 43, the inner surfaces of which are splined to receive the splined ends 44 of a rotatable shaft 45. Shaft 45 is connected to the lever 34 in a plane passing through the axis of the connection 35 in order that transverse motion of the lever 34 may be imparted to the shaft 45. This transverse motion of the lever 34 takes place when the lever moves from the position marked III to the position marked II in Figure 4. During such transverse motion, the connecting rod 32 is not actuated by reason of the track or box formation 33. Such transverse motion, however, rocks the shaft 45 and causes the yoke 38 to move the bonnet 26 outwardly and seat the valve seat 21 against the seat 20, as shown in Figure 2.

The intermediate position marked I in Figures 4 and 5 is shown in Figure 7, wherein gas may pass around the valve 15 and escape through the passages 22. This position is used during the cranking operation in order that the inertia elements may be brought up to speed.

It will thus be seen that the lever 34 is adapted to move all of the valves simultaneously and effectively into any of three positions, as above described.

In the construction shown in Figure 9, the valve 15 and valve stem 19 are mounted in a plate 46 which is formed with a cylindrical extension 47 having interior threads 48 formed therein. The threads are adapted to receive a threaded sleeve 49 which is mounted over the stem 19 and which is formed with a pinion 50 adapted to engage a rack 51, connected to the rod 32. This mechanism is housed within a bonnet 52 and includes opposed springs 53 and 54 which transmit motion between the pinion 50 and the valve stem 19. It will thus be seen that axial motion of the rack 51 will cause the threaded member 49 to be advanced or retracted axially and thus move the valve 15 into any of its desired positions.

In Figure 10 a further modification is shown wherein a plate 55 serves as a closure for the air chamber and carries the valve stem 19. The end of this valve stem is connected to a fitting 56 upon which arm 57 is formed. The fitting is received within a sleeve 58, formed on the plate 55, the fitting 56 and sleeve 58 being threadedly engaged by means of the thread formations 59. Upon motion of the arm 57, the fitting 56 is moved with respect to the sleeve 58 to actuate the valve in a desired manner. Springs 60 and 61 serve to permit a degree of yielding motion between the valve stem 19 and the fitting 56 in order that the valve may be seated effectively in either of two positions.

While the invention has been described with specific reference to the accompanying drawings, it is not to be limited, save as defined in the appended claims.

I claim:

1. Valve mechanism comprising a valve and valve stem having a plurality of operating positions, a remote manually operable mechanism, and a plurality of means to move the valve stem by the last named mechanism.

2. Valve mechanism comprising a valve and valve stem having a plurality of operating positions, a remote manually operable mechanism, a bonnet rotatably connected to the stem, means to turn the bonnet by the manual mechanism and move the same axially, and separate means to move the bonnet and stem axially by the manual mechanism.

3. Valve mechanism comprising a valve and valve stem having a plurality of operating positions, a remote manually operable mechanism, a bonnet rotatably connected to the stem, and yieldingly movable axially with respect thereto, means to turn the bonnet by the manual mechanism and move the same axially, and separate means to move the bonnet and stem axially by the manual mechanism.

4. Valve mechanism comprising a valve and valve stem having a plurality of operating positions, remote manually operable mechanism, a bonnet rotatably connected to the stem, a rock shaft connected to the manual mechanism to be rocked thereby, means to connect the rock shaft to the bonnet to move the bonnet and stem axially, a connecting rod connected to the manual mechanism to be moved axially thereby, means to connect the connecting rod to the bonnet to turn the same on its axis, and means to move the bonnet and stem axially upon turning of the bonnet.

5. Valve mechanism comprising a valve and valve stem having a plurality of operating positions, remote manually operable mechanism, a bonnet rotatably connected to the stem, a rock shaft connected to the manual mechanism to be rocked thereby, means to connect the rock shaft to the bonnet to move the bonnet and stem axially, a connecting rod connected to the manual mechanism to be moved axially thereby, a lever on the bonnet, yielding means to connect the lever to the connecting rod, and means to move the bonnet and stem axially upon turning of the bonnet.

6. Valve mechanism comprising a valve and valve stem having a plurality of operating positions, a plate upon which the stem is mounted with provision for axial motion, a sleeve on the plate concentric with the stem, a bonnet over the sleeve and connected to the stem with provision for rotation with respect thereto, means between the bonnet and sleeve to move the bonnet axially with respect to the sleeve upon rotation of the bonnet with respect to the sleeve, a remote manually operable mechanism, and means to move the bonnet axially by the manual mechanism.

7. Valve mechanism comprising a valve and valve stem having a plurality of operating positions, a plate upon which the stem is mounted with provision for axial motion, a sleeve on the plate concentric with the stem, a bonnet over the sleeve and connected to the stem with provision for rotation with respect thereto, means between the bonnet and sleeve to move the bonnet axially with respect to the sleeve upon rotation of the bonnet with respect to the sleeve, a remote manually operable mechanism and a plurality of means to move the bonnet axially by the manual mechanism.

8. Valve mechanism comprising a valve and valve stem having a plurality of operating positions, a plate upon which the stem is mounted with provision for axial motion, a sleeve on the plate concentric with the stem, a bonnet over the sleeve and connected to the stem with provision for rotation wih respect thereto, means between the bonnet and sleeve to move the bonnet axially with respect to the sleeve upon rotation of the bonnet with respect to the sleeve, a remote manually operable mechanism, means to move the bonnet and valve into two positions by the manual mechanism, and separate means to move the valve into a third position by the manual mechanism.

9. Valve mechanism comprising a valve and valve stem having a plurality of operating positions, a plate upon which the stem is mounted with provision for axial motion, a sleeve on the plate concentric with the stem, a bonnet over the sleeve and connected to the stem with provision for rotation with respect thereto, means between the bonnet and sleeve to move the bonnet axially with respect to the sleeve upon rotation of the bonnet with respect to the sleeve, a remote manually operable mechanism, a rock shaft connected to the bonnet and manual mechanism to move the bonnet and stem into two positions, and a connecting rod connected to the bonnet and manual mechanism to move the bonnet and stem into a third position.

10. Valve mechanism comprising a valve and valve stem having a plurality of operating positions, a plate upon which the stem is mounted with provision for axial motion, a sleeve on the plate concentric with the stem, a bonnet over the sleeve and connected to the stem with provision for rotation with respect thereto. means between the bonnet and sleeve to move the bonnet axially with respect to the sleeve upon rotation of the bonnet with respect to the sleeve, a remote manually operable mechanism a rock shaft connected to the bonnet and manual mechanism to move the bonnet and stem into two positions, a connecting rod connected to the bonnet and manual mechanism to move the bonnet and stem into a third position, and yielding means between the connecting rod and the bonnet.

BRUNO LOEFFLER.